US006718184B1

(12) United States Patent
Aiken et al.

(10) Patent No.: US 6,718,184 B1
(45) Date of Patent: Apr. 6, 2004

(54) METHOD AND SYSTEM FOR ADAPTIVE SIGNAL PROCESSING FOR AN ANTENNA ARRAY

(75) Inventors: Richard Thomas Aiken, Covent Station, NJ (US); Dennis Raymond Morgan, Morristown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 447 days.

(21) Appl. No.: 09/671,241

(22) Filed: Sep. 28, 2000

(51) Int. Cl.[7] ............................................. H04M 1/00
(52) U.S. Cl. .................... 455/562.1; 455/453; 455/561; 455/524; 455/525; 342/367; 342/373; 342/378; 342/383
(58) Field of Search ................................. 455/562, 453, 455/446, 561, 456, 457, 65, 524, 525, 456.1, 562.1; 342/383, 367, 372, 373, 378

(56) References Cited

U.S. PATENT DOCUMENTS

| 4,965,732 A | * | 10/1990 | Roy et al. .................... 342/147 |
| 6,101,399 A | * | 8/2000 | Raleigh et al. ............. 455/561 |
| 6,167,039 A | * | 12/2000 | Karlsson et al. ............ 370/342 |
| 6,317,586 B1 | * | 11/2001 | Haardt ..................... 455/67.16 |
| 6,477,161 B1 | * | 11/2002 | Hudson et al. ............. 370/342 |

OTHER PUBLICATIONS

J.M. Goldberg and J. R. Fonollosa, "Downlink beamforming for spatially distributed sources in cellular mobile communications", Signal Processing 65 (1998), pp. 181–197.
T. Aste, P. Forster, L. Fety and S. Mayrargue, "Downlink Beamforming Avoiding DOA Estimation For Cellular Mobile Communications," Signal Processing 6 (1998),, pp. 3313–3316.

J. Goldberg and J. Fonollosa, "Downlink Beamforming For Cellular Mobile Communications," IEEE Vehicular Technology Conference 1997, vol. 47, No. 2, pp. 632–636.
R. L. Cupo, G. D. Golden, C.C. Martin, K. L. Sherman, N. R. Sollenberger, J. H. Winters and P. W. Wolniansky, "A Four–Element Adaptive Antenna Array For IS–136 PCS Base Stations," IEEE, 1997, pp. 1577–1581.
G. G. Raleigh V.K. Jones, "Adaptive Antenna Transmission for Frequency Duplex Digital Wireless Communication," IEEE, 1997, pp. 641–646.

* cited by examiner

Primary Examiner—Nay Maung
Assistant Examiner—Sujatha Sharma

(57) ABSTRACT

A method for processing signals from multiple receiving/transmitting elements that define an array antenna is disclosed. The method includes measuring uplink signals from the elements of the array antenna to form a directional downlink antenna response. A first covariance matrix between pairs of uplink signals is determined for desired signal components of the measured uplink signals. A second covariance matrix is determined for noise and interference components of the measured uplink signals. An antenna processing system computes adaptive weights based on the first covariance matrix, the second covariance matrix and a loading term to in effect form a directional downlink radiation pattern. The loading term represents a balance adjustment between a first performance rating of a particular coverage area versus second performance rating of the wireless communication system. The first performance rating can represent the extent of providing a desired downlink power of a downlink signal to a subscriber station within a particular coverage area such as a sector or cell. The second performance rating can represent the extent of suppressing interference to other subscriber stations in the wireless communication system.

24 Claims, 4 Drawing Sheets

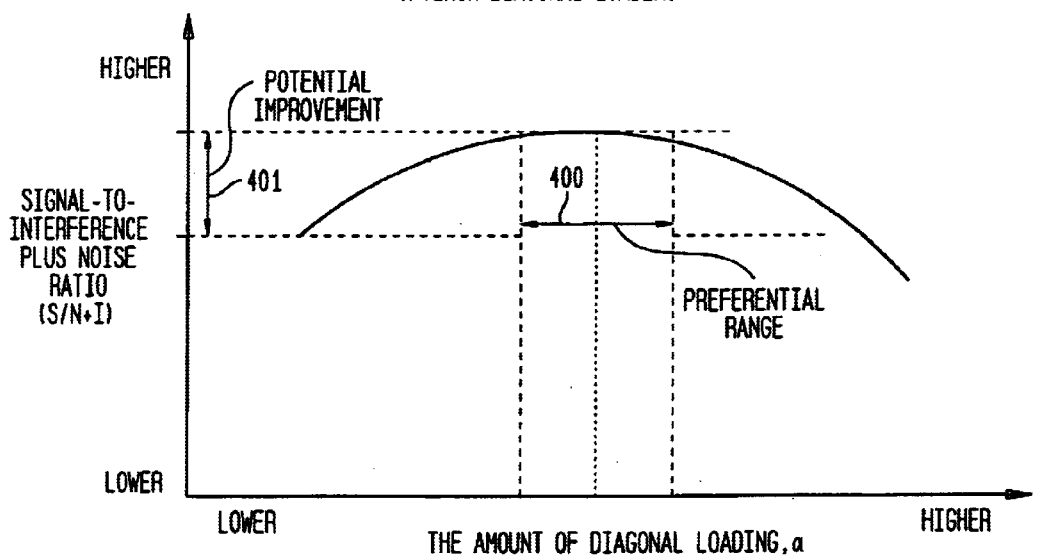

METHOD AND SYSTEM FOR ADAPTIVE SIGNAL PROCESSING FOR AN ANTENNA ARRAY

FIELD OF THE INVENTION

This invention relates generally to wireless communication systems and more particularly to a method and system for downlink signal processing for an antenna array.

BACKGROUND OF THE INVENTION

An adaptive signal processing system can be used to improve uplink performance, downlink performance, or both of an antenna array. Downlink performance refers to signal quality of a transmission from a base station to a subscriber station, whereas uplink performance refers to signal quality of a transmission from a subscriber station to a base station. An adaptive algorithm evaluates reception characteristics of one or more uplink signals to provide guidance in altering signal processing associated with antenna performance. For example, the uplink beam can be filtered or steered toward a direction that provides the best signal-to-noise ratio of the received uplink signals.

In the Background Art, adaptive signal processing techniques have more effectively improved uplink performance than downlink performance because uplink antennas and downlink antennas are frequently not symmetrical in design. For example, downlink antennas are often configured as three-sector configurations without spatial diversity, whereas uplink antennas can have more flexible radiation patterns and can feature spatial diversity. The uplink signal can fade differently than the downlink signal because of a frequency difference between the uplink signal and the downlink signal. Further, the time lag between uplink signal processing and downlink signal processing can lead to inaccuracies in the downlink signal processing which degrades the theoretically attainable signal-to-interference ratio for the entire wireless communication system.

Without commensurate increases or improvements in the uplink signal-to-interference ratio and the downlink signal-to-interference ratio, the frequency reuse of a wireless system does not realize the full potential of an adaptive array antenna. Thus, a need exists for an adaptive signal processing technique to facilitate increased frequency reuse and improved traffic capacity of wireless communication systems in both uplink and downlink modes of operation.

SUMMARY OF THE INVENTION

The invention, in part, provides an adaptive processing system (and method embodied therein) that can reduce interference perceived by the subscriber stations by controlling downlink radiation patterns of the base station with respect to out-of-cell subscriber stations. The downlink radiation patterns are controlled based on the interference and the desired signal received at the base station. No communications between base stations within the wireless communications system are necessary to reduce the system-wide interference. Thus, the adaptive processing system of the invention is well-suited for reducing system-wide interference without increasing inter-site overhead traffic to manage the reduction of interference.

In such a method of signal processing for an array antenna, uplink signals from the plurality of receiving/transmitting elements defining an array antenna are measured to determine covariance measurements between pairs of the uplink signals. A first covariance matrix is determined for a desired signal component of the measured uplink signals. A second covariance matrix is determined for a noise and interference component of the measured uplink signals.

Also related to such a method, an antenna processing system computes adaptive weights based on the first covariance matrix, the second covariance matrix, and a loading term to, in effect, form a desired directional downlink radiation pattern. The loading term represents a balance adjustment between a first performance rating of a particular coverage area versus a second performance rating of the wireless communication system, e.g., defined as a network of base stations serving a locality. The first performance rating can represent the extent that the processing system provides a desired downlink power of a downlink signal to a subscriber station within a particular coverage area, such as a sector or cell. The second performance rating can represent the extent that processing systems deployed throughout the wireless communication system suppress interference power to the downlink signal as perceived by the subscriber station in the particular coverage area. The interference power can result from neighboring coverage areas of the wireless communication system, for example.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention.

FIG. 4 is a graph of signal-to-interference (plus noise) ratio versus diagonal loading in accordance with the invention.

DETAILED DESCRIPTION OF PREFERRED EMBODIMENTS

Figure 1:
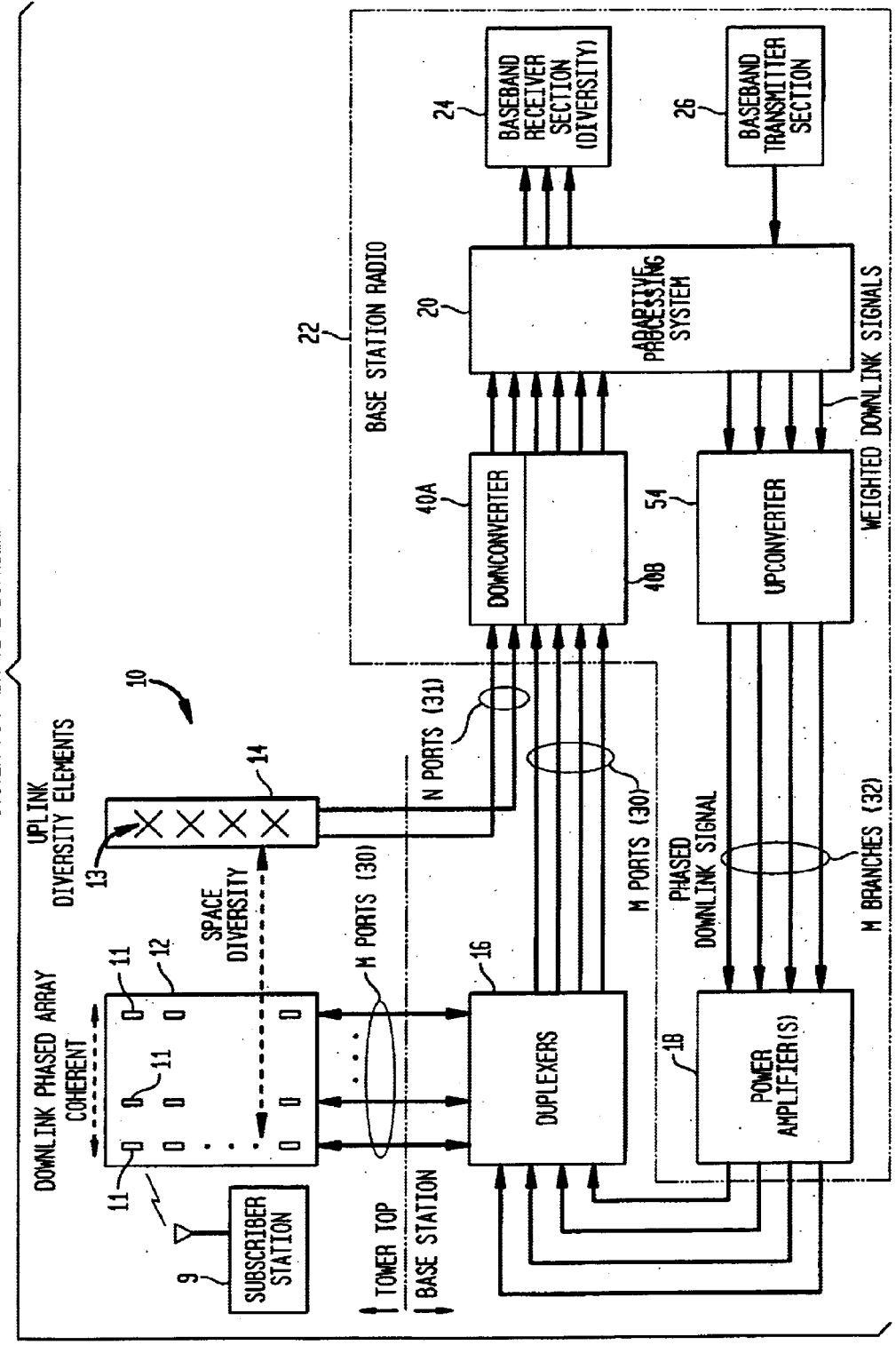
FIG. 1 is a block diagram of a system for adaptive signal processing, coupled to an antenna array, in accordance with the invention.

In accordance with the invention, FIG. 1 depicts a wireless communication system operating, e.g., according to TDMA or CDMA. There, an antenna array 10 is coupled to duplexers 16 and downconverters 40A and 40B of the base station radio 22. The duplexers 16 provide duplexing of signals to provide separate transmit signal paths and receive signal paths to and from a base station radio 22. The radio 22 includes an adaptive processing system 20 that processes baseband signals to enhance the performance of the downlink and uplink signals associated with one or more subscriber stations (e.g., mobile stations).

The antenna array 10 includes a phased array 12 and a diversity array 14. The downconverter 40A has N ports connected to the diversity array 14. The downconverter 40B has M ports connected to the phased array 12 via the duplexers 16. The phased array 12 comprises a matrix of receiving/transmitting antenna elements (e.g. dipoles or monopoles) arranged into columns 11. The separation between adjacent antenna columns 11 yields a coherent signal response among M antenna ports of the phased array 12 upon reception of a received uplink signal from the subscriber station 9. For example, adjacent columns 11 of the phased array 12 can have any suitable horizontal spacing, such as two wavelengths or less, to provide such a coherent signal response. In a preferred configuration, the horizontal spacing between adjacent columns of the phased array 12 can be approximately one-half of a wavelength or less to prevent unwanted images (e.g., grating lobes) in the radiation pattern. Within a column 11, a vertical spacing of antenna elements can have any suitable spacing, such as two wavelengths or less. In a preferred configuration, the vertical spacing of antenna elements can be approximately one-half wavelength or less, although other suitable vertical spacings fall within the scope of the invention.

During reception, the antenna columns 11 of the phased array 12 interact such that the M uplink signals on M antenna ports 30 are highly correlated with respect to one another. As used herein, highly correlated includes any correlation approaching one on a scale ranging from zero to one and lesser correlations that are associated with similar fading responses among the M antenna ports 30 or controllable beam forming contributions among the M antenna ports 30. That is, the M uplink signals display similar fading responses as a subscriber station 9 moves through a coverage area (e.g., sector or cell) served by the antenna array 10.

During transmission, the antenna columns 11 of the phased array 12 interact such that the M downlink signals on the M antenna ports are highly correlated with respect to each other. Because the columns 11 of the phased array 12 are closely spaced (e.g., one-half wave length in the above manner) the phased array 12 is well-suited for beam-forming or beam-steering applications, and for null-forming or null-steering applications by varying the phase or amplitude among the M baseband signals or through digital signal processing by the application of downlink antenna weights.

The antenna elements within the columns 11 of the phased array 12 can be linearly and vertically polarized, although other polarization such as circular or cross-polarization, or otherwise, fall within the scope of the invention. Each column 11 can be center-fed, end-fired, or otherwise fed with a suitable transmission line arrangement (e.g. strip line) such that a single antenna port (of the M ports 30) is generally associated with a corresponding column.

The diversity array 14 is separated from the phased array 12 by a separation distance sufficient to provide diversity reception performance. For example, the phased array 12 is preferably horizontally separated from the diversity array 14 in a range of approximately five to twenty wavelengths at the frequency of operation, although other suitable wavelength distances and spatial arrangements fall within the scope of the invention. The phased array 12 and the diversity array 14 are preferably horizontally separated, but the phased array 12 and the diversity array 14 can be vertically separated or both horizontally and vertically separated to provide space-diversity gain.

In one form of the diversity array 14, the antenna elements within N columns 13 (only one being depicted as a simple configuration having N=1) of the diversity array 14 are preferably diagonally oriented at approximately a forty-five angle from a vertical axis. The antenna elements within each column 13 are preferably orthogonally oriented with respect to each other so as to have a cross-like appearance illustrated in FIG. 1. The N columns 13 provide N corresponding antenna output ports 31. The antenna elements of the diversity array 14 are preferably cross-polarized, such that the diversity array 14 receives both horizontally polarized and vertically polarized signals in an equivalent manner.

In alternative embodiments, the antenna elements of the diversity array 14 can be vertically polarized, circularly polarized, or otherwise configured.

Although the diversity array 14 shown has N equal to one (i.e., one column 13), in another configuration, the diversity array can have multiple columns 13. As is known, N can vary according to the physical environment surrounding the antenna array 10. If the diversity array 14 has multiple columns 13, any adjacent columns 13 of the diversity array 14 are preferably spaced farther apart than the adjacent columns 11 of the phased array 12. For example, the adjacent columns 13 of the diversity array 14 can have a horizontal spacing greater than the horizontal spacing of the adjacent columns 11 of the phased array 12 at the frequency of operation.

In a preferred embodiment, the phased array 12 and the diversity array 14 are used together for reception of an uplink signal from at least one subscriber station 9. Further, the phased array 12 alone is preferably used for downlink transmission to the subscriber station 9. In the uplink signal path, the phased array 12 provides M uplink signals to the duplexers 16 and the diversity array 14 provides N uplink signals to the adaptive processing system 20 via the downconverter 40A. The duplexers 16 direct the M uplink signals to the adaptive processing system 20 via the downconverter 40B.

The base station radio 22 includes the downconverters 40A and 40B coupled to the adaptive processing system 20. In turn, the adaptive processing system 20 is coupled to a baseband receiver section 24. The downconverter 40B receives the M uplink signals and downconverter 40A receives the N uplink signals and down-converts them to baseband or to an intermediate frequency suitable for digital signal processing in the adaptive processing system 20.

The baseband receiver section 24 is preferably equipped with multiple ports to provide diversity reception. The M uplink signals and the N uplink signals are used together to attain diversity gain in symbol detection, where possible. The baseband receiver section 24 first uses M uplink signals from the phased array 12 and the N uplink signals from the diversity array 14 to recover data symbols (transmitted by the subscriber station 9) as symbol estimates. Next, the symbol estimates are used to reconstruct a desired signal (transmitted from the subscriber station 9) as a channel estimate. The adaptive processing system 20 evaluates the uplink signals and can apply uplink weights to, in effect, direct or optimize the uplink reception of the transmission from a subscriber station 9. The uplink antenna weights preferably represent relative phase shifts and/or relative amplitudes between different ones of the M ports 30 and the N ports 31.

For the downlink signal path, the base station radio 22 has a baseband transmitter section 26 for transmitting at baseband or an intermediate frequency. The baseband transmitter section 26 feeds the adaptive signal processing system 20. The adaptive signal processing system 20 determines M adaptive downlink weights to change an amplitude and/or relative phase between any pair of M branches (32) that feed the phased array 12. An upconverter 54 up-converts the weighted baseband or intermediate frequency signals from the adaptive processing system 20, e.g., radio frequency signals. One or more power amplifiers 18 amplify the signals in a manner that preserves the phase and/or amplitude relationship imparted by the processing system 20. The output of the power amplifiers 18 is coupled to the duplexers 16. Accordingly, the downlink signal is transmitted over the phased array 12 under the influence of the adaptive weights from the adaptive processing system 20.

Figure 2:
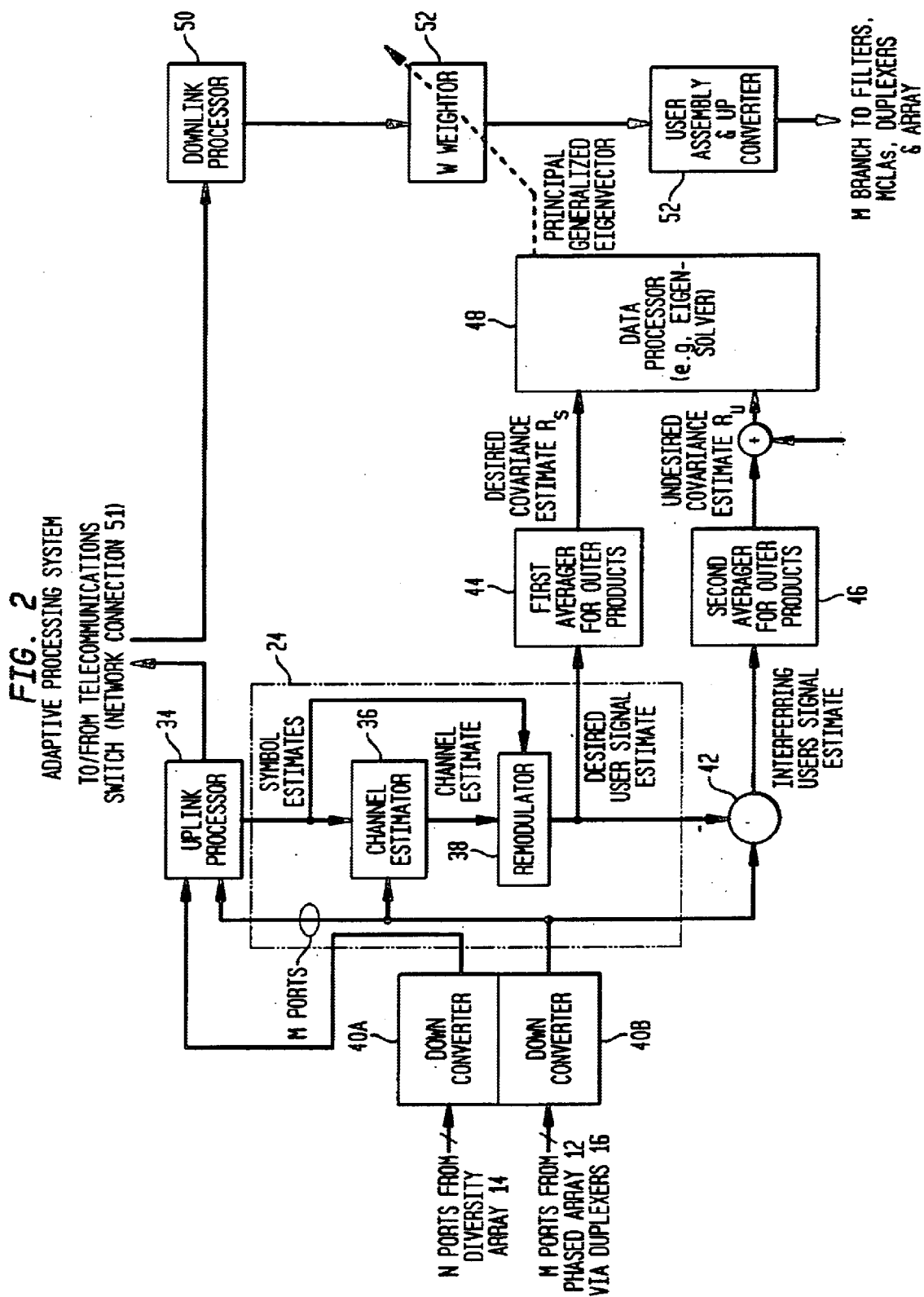
FIG. 2 illustrates the adaptive processing system of FIG. 1 in more detail.

FIG. 2 shows the adaptive processing system 20 of FIG. 1 in more detail. The adaptive processing system 20 includes an uplink processor 34, which is coupled to the downconverters 40A and 40B and to a network connection 51 of the wireless communications system. The uplink processor 34 in turn is coupled to a channel estimator 36 and a remodulator 38. The remodulator 38 can generate a modulated signal, such as a pulse code modulated signal. The uplink processor 34 provides symbol estimates to the channel estimator 36. The channel estimator 36 provides a channel estimate to the remodulator 38 based upon an input of the symbol estimates and a down-converted (or composite) signals (representing the outputs of the M ports 30) from the downconverter 40B. Again, the down-converted signals from the downconverter 40B are derived from the M ports 30 coupled to the phased array 12 and downconverted signals from the downconverter 40A are derived from the N ports 31 from the diversity array 14.

The M ports 30 and the N ports 31 that feed the downconverters 40A and 40B allow the downconverters 40A and 40B to provide composite signals including desired signals for the particular subscriber station 9 and interference signals of interfering subscriber stations that interfere with the base station's reception of the particular subscriber station 9. The remodulator 38 extracts or provides the desired signals based on an evaluation of the composite signals from the subscriber station 9 (via the downconverters 40A and 40B) in a particular coverage area. A summer 42 subtracts the desired signals from the composite signals to obtain the interference signals.

A first averager 44 for averaging outer products of the desired signals is coupled to the remodulator 38. A second averager 46 for averaging the outer products of the interference signals is coupled to the summer 42.

Generally, outer products are the products resulting from multiplying a vector by itself. Here, the outer product of a vector represents all combinations of the M components per sample. For the phased array 12 of FIG. 1, the outer product is arranged in an M column by M row matrix for each sampling period. If the vector of the desired signal is $x_1, x_2, x_3, \ldots x_M$ for any sampling period, the outer products can represent an M by M matrix as follows:

| $R_{1,1}$ | $R_{1,2}$ | $R_{1,3}$ | $R_{1,M}$ |
|---|---|---|---|
| $R_{2,1}$ | $R_{2,2}$ | $R_{2,3}$ | $R_{2,M}$ |
| $R_{3,1}$ | $R_{3,2}$ | $R_{3,3}$ | $R_{3,M}$ |
| . | . | . | . |
| . | . | . | . |
| . | . | . | . |
| $R_{M,1}$ | $R_{M,2}$ | $R_{M,3}$ | $R_{M,M}$ | where the first subscript represents a member (sometimes different, though sometimes the same as on the diagonal) of the vector of the desired signal and the second subscript represents a member of the vector of the desired signal. For example, the entries in the diagonal extending from $R_{11}$, $R_{22} \ldots, R_{MM}$, represent $x_1^2, x_2^2, \ldots x_M^2$, respectively. The output of the first averager 44 represents a first covariance matrix ($R_s$). The first covariance matrix ($R_s$) provides desired covariance estimates between pairs of the signals of the M ports. If the phased array has M columns with M output ports, the first covariance matrix is preferably an M column by M row matrix.

Both the desired signals from remodulator 38 and the interference signals from summer 42 can be expressed as vectors. In one embodiment, the desired signal vector contains M components at any given time instant, where the phased array 12 has M columns. The interference signal vector contains M components at any given time instant or time sample, where the phased array 12 has M columns. Each time sample represents a snap shot of one of the signals present at the M ports of the phased array 12.

The output of the second averager 46 represents a second covariance matrix ($R_u$). The second matrix ($R_u$) provides undesired covariance estimates between pairs of the signals of antenna ports M. If the phased array has M columns with M output ports, the second covariance matrix is preferably a M column by M row matrix.

The second covariance matrix is fed into a summer 56, which adds a loading term ($\alpha$ or alpha). Alpha can be referred to as diagonal loading. The loading term, alpha, is multiplied by an identity matrix (I) and added to the second covariance matrix ($R_u$). The resultant output from the summer 56 and the first covariance matrix ($R_s$) are fed into a data processor 48, such as an eigen solver.

Again, the first averager 44 takes an average of each corresponding entry within a first group of matrices to provide the first covariance matrix. Each matrix within the group represents values of the outer products for a sample. Each entry of the first covariance matrix represents an average of the outer products over a certain minimum number of samples. The interval between successive first covariance matrices or the minimum number of samples has a frequency which is preferably commensurate with the frequency of the downlink fading variations that could occur in the downlink signal. And, again, the second averager 46 takes an average of each entry of a second group of matrices to determine the second covariance matrix in a similar manner to the first averager 44.

The data processor 48 outputs a principal generalized eigenvector based on an input of the first covariance matrix and an expression based on the second covariance matrix. The principal generalized eigenvector facilitates maximization of the signal power received by the particular subscriber station 9 in a particular area and can facilitate a balanced distribution of interference power among the particular subscriber station 9 and other subscriber stations in neighboring coverage areas. The principal generalized eigenvector depends upon both the first covariance matrix and the second covariance matrix. Although an eigenvector can be determined with respect to one matrix, a generalized eigenvector is determined with respect to two matrices.

The generalized eigenvector is the solution to the generalized eigenvalue equation (Equation No. 1) which is:

$$R_s w = \lambda (R_u + \alpha I) w \quad (1)$$

where $R_s$ is the first covariance matrix, w is the generalized eigenvector, $\lambda$ is the eigenvalue, $R_u$ is the second covariance matrix, $\alpha$ is the loading term, and I is an identify matrix. Stated in words, the generalized eigenvalue equation (Equation No. 1) is the first covariance matrix multiplied by the eigenvector equals the eigenvalue multiplied by the diagonally-loaded second covariance matrix multiplied by the eigenvector.

The data processor 48 (e.g., an eigen-solver) can solve for the principal generalized eigenvector by using row reduction of an augmentation of the first covariance matrix, the second covariance matrix, or both. Alternatively, the data processor 48 can solve a characteristic polynomial by determining roots of the characteristic polynomial to determine eigenvalues. Row reduction and determining roots of characteristic polynomials are techniques well-known to those skilled in mathematics and are available as canned computer algorithms.

The principal generalized eigenvector can also be recursively or iteratively solved in accordance with Equation No. 2:

$$(R_u + \alpha I)w_1 = R_s w_0 \qquad (2)$$

where $w_O$ is a first iteration of a proposed solution of the principal generalized eigenvector, and $w_1$ is a second iteration of a proposed solution to the principal generalized eigenvector. After selecting an arbitrary value for $w_)$ (e.g., a vector with all values equal to 1) and substituting in values of $R_s$ and $R_u$, Equation No. 2 is solved for $w_1$ which represents an estimate of the principal generalized eigenvector. Other related equations could be used to complete successive iterations in accordance with a recursive power method, such as a third iteration through an nth iteration. The use of Equation No. 2, can provide sufficient accuracy for purposes of improving the balance of interference and the desired signal in the wireless communications system. Thus, it is noted that the solution of Equation No. 2 is significantly more simple than the solution of Equation No. 1.

The resultant principal generalized eigenvector (w) maximizes Equation No. 3, which is in the form of a Rayleigh quotient, over all possible values of w ("over w").

$$\frac{w^H R_s w}{w^H (R_u + \alpha I) w} \qquad (3)$$

The term $w^H$ is a complex conjugate transpose (or Hermitian) of the adaptive weight vector w. The use of the resultant principal generalized eigenvector (w) achieves a compromise between a first performance rating, namely the maximization of the signal power $w^H R_s w$ (the numerator of Equation No. 3), and a second performance rating, namely the minimization of the interference power $w^H R_u w$ (found in the denominator of Equation No. 3).

The first performance rating represents the power of a desired downlink signal transmitted from a base station to a subscriber station in a particular coverage area (e.g., cell or sector). The second performance rating relates to the signal quality as perceived by subscriber stations throughout the wireless communications system, as opposed to only a particular coverage area. Thus, the second performance rating represents the interference power in the particular coverage area from neighboring coverage areas.

A desired level of the second performance rating is attained by suppression of interference or by minimizing interference in a balanced way to a majority of subscriber stations actively using the wireless communications system (either within the same cell and/or in other cells), including subscriber stations other than the particular subscriber station 9 in the particular coverage area. Accordingly, the base station radio 22 transmitting the downlink signal to the particular subscriber station 9 in the particular coverage area uses the adaptive signal processing system 20 of the invention to suppress interference to subscriber stations in surrounding coverage areas that surround the particular coverage area. If the desired level of the second performance rating is attained independently by each base station throughout the wireless communications system, it follows that the desired level of an interference power can be maintained within the particular coverage area for the particular subscriber station 9.

If Equation No. 3 is maximized for at least a group of coverage areas of a wireless system, a desired level of the second performance rating can consequently be achieved for part or all of the group. Ideally, each base station in the wireless system would be equipped with a signal processing system 20 that can maximize Equation No. 3 such that the desired level of the second performance parameter is satisfied. In other words, if all base stations operating independently feature downlink signal processing that suppresses interference to subscriber stations in surrounding or adjacent coverage areas (e.g., cells or sectors) to a comparable extent, a desired level of the second performance rating can be met.

The loading term, $\alpha$, found in the second performance rating (in the denominator of Equation No. 3), can be determined empirically by measurements throughout the wireless communication system. Approximately the same value of $\alpha$ can be used for each base station site within the wireless communication system or the $\alpha$ value can be adjusted for differences in terrain and other geographic features affecting propagation of the electromagnetic signals within the wireless communication system. In practice, where $\alpha$ equals zero or where $\alpha$ approaches zero, the first performance rating is degraded with respect to the second performance rating. To the contrary, if $\alpha$ greatly exceeds the norm of $R_u$, the first performance rating exceeds the second performance rating.

In accordance with simulated studies of optimized wireless communications networks, a proper balance between the first performance rating and a second performance rating can be produced where $\alpha$ falls within an optimum range. For example, if $\alpha$ falls within a preferential range between 0.01 and 0.1, a relationship between the first performance rating and the second performance rating is balanced such that all or most of the subscribers using different mobile stations within the wireless network achieve an adequate level of performance in terms of signal-to-interference ratio.

The input to the downlink processor 50 comes from a network connection 51 (such as a telecommunications switch or the like) to the wireless communications system, e.g., (again) defined as a network of base stations serving a locality. The output of the eigen-solver 48 and the output of a downlink processor 50 are used to determine adaptive antenna weights, w, for the downlink signal. For example, w can be determined by, first, selecting $\alpha$ to balance the geographic distribution of interference within the wireless communication system among the subscriber stations; second, determining the first covariance matrix ($R_s$) and the second covariance matrix ($R_u$); and third, maximizing Equation No. 3 by solving Equation No. 1 or Equation No. 2 for w through a determination of the principal generalized eigenvector.

The principal generalized eigenvector, w, also represents the downlink adaptive antenna weights. It can be expressed as a vector of M terms for each sampling period, where the phased array 12 has M columns. In a preferred embodiment, the downlink antenna weights, w, are selected to direct or shape one or more nulls toward interfering subscribers to facilitate reduction of system-wide interference in the wireless communications system.

The adaptive antenna weights, w, are applied by a weightor 52 to the downlink signal and are fed to upconverter 54.

The weightor 52 can comprise a digital signal processor that modifies values of digital signals, consistent with the input from the data processor 48 and a downlink processor 50, to provide the adaptively weighted digital baseband signals as output. The adaptive antenna weights are applied to the M branches 32 to adjust the differential phase, differential amplitude (or both) or other signal parameters among the branches to produce directional or beam-formed radiation patterns via the phased array 12. The adaptive weighting can vary on a symbol-by-symbol basis or on a symbol group-by-symbol group basis.

The upconverter 54 is coupled to the M branches (32), which feed the M antenna ports 30 of the phased array 12. The M branches (32) can be coupled to one or more power amplifiers 18 as shown in FIG. 1.

The adaptive downlink processing system 20 shown in FIG. 2 can represent a single data processor for processing software instructions and appropriate hardware interfaces to the base station radio 22 and the phased array 12 antenna. Accordingly, the interconnections between the various components shown in FIG. 2 can represent logical communications (e.g., data transfer and exchange) based on the underlying software instructions and physical communication lines (e.g., databuses) between hardware interfaces and one or more data processors. For example, the system shown in FIG. 2 can include an up converter 54, downconverters 40A and 40B and a digital signal processor (DSP), where the DSP implements the uplink processor 34, the downlink processor 50, the channel estimator 36, the first averager 44, the second averager 46, the summers (42, 56), the data processor 48 and the weightor 52. Further, the remodulator 38 can comprise a phase-shift-keying (PSK) remodulator 38, or another remodulator 38 depending upon the air interface.

Figure 3:
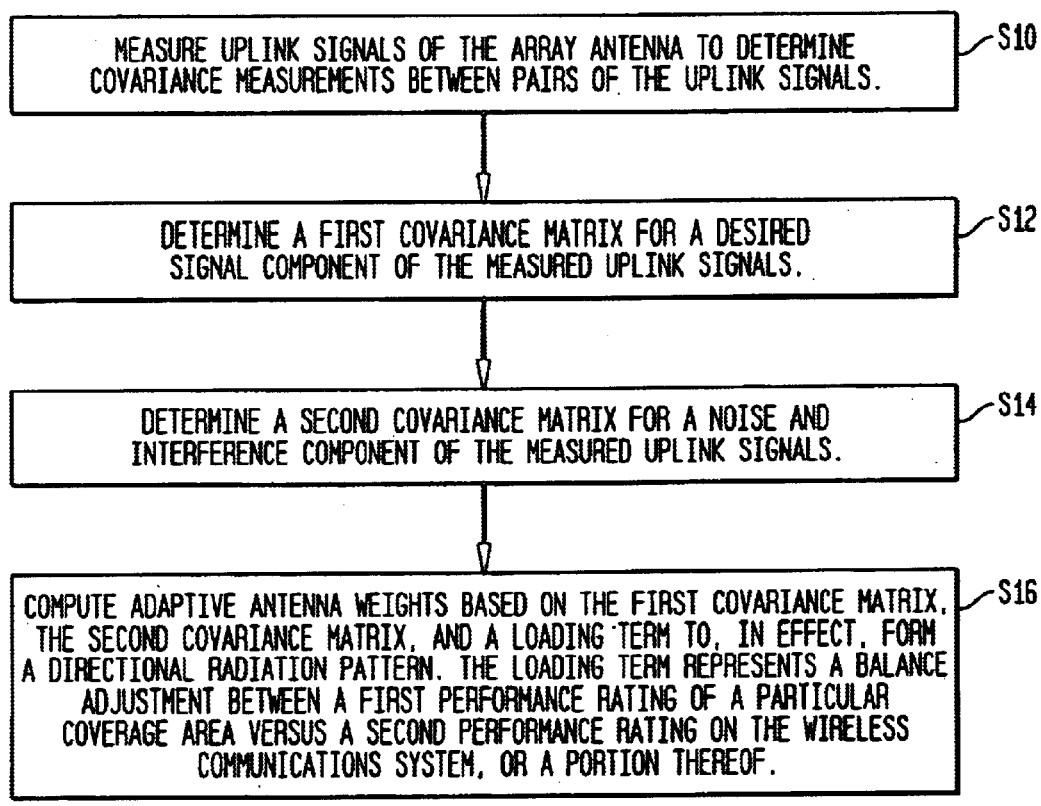
FIG. 3 is a flow diagram of a method for signal processing of an array antenna in accordance with the invention.

FIG. 3 is a flow diagram of the method for signal processing of an array antenna in accordance with the invention. In step S10, the adaptive processing system 20 measures uplink signals of the array antenna to determine covariance measurements between pairs of the uplink signals.

In step S12, the adaptive processing system 20 determines a first covariance matrix ($R_s$) for a desired signal component of the measured uplink signals. The desired signal component of the measured uplink signals represents an uplink signal from a particular subscriber station 9 within a particular coverage area, such as a sector or a cell.

In step S14, after step S12 or simultaneously with step S12, the adaptive processing system 20 determines a second covariance matrix ($R_u$) for a noise and interference component of a measured uplink signal. The noise and interference component represents the power or signal level of interfering subscriber stations from neighboring coverage areas, neighboring or surrounding the particular coverage area as received at a base station. The interference interferes with the base station's reception of the desired signal from a particular subscriber station. The noise component represents background electromagnetic radiation and electronic noise in the frequency of operation of the base station radio 22. The noise component can include the thermal noise and electromagnetic radiating sources other than the wireless communications system. The interference component represents transmission from subscriber stations from other users (e.g., co-channel users) of the wireless communication system with respect to the base station's reception of a particular subscriber station 9.

In step S16, the adaptive signal processing system computes adaptive antenna weights, expressed as vector w, that can be based on the first covariance matrix ($R_s$), the second covariance matrix ($R_u$), and a loading ($\alpha$) term to, in effect, form a directional radiation pattern. The loading term represents a balance adjustment between the first performance rating of a particular coverage area for the particular subscriber station 9 and the second performance rating relating to the balanced distribution or suppression of interference within the wireless communication system.

FIG. 4 shows a preferential range of $\alpha$ and the resultant signal-to-interference (plus noise) ratio. The horizontal axis of FIG. 4 shows the amount of diagonal loading ($\alpha$) and the vertical axis shows the signal-to-interference (plus noise) ratio. A preferential range 400 extends between the two vertical dashed lines in FIG. 4. As the loading decreases or increases from the preferential range 400, the signal-to-interference (plus noise) ratio for most or all users is degraded. Accordingly, the foregoing method and system for signal processing described herein can produce a potential improvement 401 in the signal-to-interference (plus noise) ratio as illustrated along the vertical axis of FIG. 4.

The loading term ($\alpha$) is considered in balance if the loading term ($\alpha$) falls within the preferential range 400 that achieves a minimum signal-to-interference (plus noise) ratio for at least a majority of the subscriber stations in the wireless system, regardless of the coverage area in which the subscriber stations are located at any given instantaneous time. The loading term ($\alpha$) is considered out-of-balance where the loading is outside of the preferential range so that some significant percentage of users of the wireless system experience a degraded signal-to-interference plus noise performance compared to other users.

The adaptive processing system according to the invention has an advantage in that interference perceived by the subscriber stations 9 can be reduced by controlling downlink radiation patterns of the base station with respect to out-of-cell subscriber stations. The downlink radiation patterns are controlled based on the interference and the desired signal received at the base station. No communications between base stations within the wireless communications system are necessary to reduce the system-wide interference because of a pre-established cooperative arrangement among the base stations to employ the adaptive processing system with suitable values of alpha. Thus, the adaptive processing system of the invention is well-suited for reducing system-wide interference without increasing inter-site overhead traffic to manage the reduction of interference.

The specification describes various illustrative embodiments of the system and method of the invention. The scope of the claims is intended to cover various modifications and equivalent arrangement of the illustrative embodiments disclosed in the specification. Therefore, the following claims should be accorded the reasonably broadest interpretation to cover modifications equivalent structures and features, which are consistent with the spirit and scope of the invention disclosed herein.

The following is claimed:

1. A method of signal processing for an array antenna, having a plurality of receiving/transmitting elements, of a base station in a wireless communications system, the method comprising:

measuring uplink signals from said elements of the array antenna to determine covariance measurements between pairs of the uplink signals;

determining a first covariance matrix for desired signal components of the measured uplink signals;

determining a second covariance matrix for noise and interference components of the measured uplink signals; and determining adaptive antenna weights based on the first covariance matrix, the second covariance matrix, and a loading term, the loading term controlling contributions to said antenna weights by said first covariance matrix relative to contributions to said antenna weights by said second covariance matrix.

2. The method according to claim 1, wherein the determining step comprises:

determining downlink antenna weights based on the first covariance matrix, the second covariance, and the loading term, where the loading term is selected to balance the distribution of interference to different subscriber stations within the wireless communications system.

3. The method according to claim 1, wherein the adaptive weights are determined so as to balance a signal strength of a downlink signal from the base station at a desired subscriber station against interfering signal strength to other subscriber stations in the wireless communications system.

4. The method according to claim 3, wherein, when all base stations operate independently to achieve said balance, respectively, then a ratio of desired downlink signal strength relative to the combined strength of interfering downlink signals at the desired subscriber station is optimized.

5. The method according to claim 1, wherein, in the determining step, the adaptive weights comprise adaptive weight vectors, w, that are determined so as to maximize the following expression over w:

$$w^H R_s w / w^H (R_u + \alpha I) w;$$

where $R_s$ is the first covariance matrix for a desired signal, $R_u$ is the second covariance matrix for noise and co-channel interference, $w^H$ is a complex conjugate transpose of the adaptive weight vector w, I is an identity matrix, and $\alpha$ is an operator-definable scalar constant that represents the balance adjustment between a first performance rating and a second performance rating, the first performance rating being a maximization of $w^H R_s w$, and the second performance rating being a minimization of $w^H R_u w$.

6. The method according to claim 5, wherein when $\alpha$ equals zero or when $\alpha$ approaches zero, the first performance rating is degraded with respect to the second performance rating.

7. The method according to claim 5, wherein if $\alpha$ exceeds the norm of $R_u$ by a predetermined margin, the first performance rating exceeds the second performance rating.

8. The method according to claim 5, wherein if $\alpha$ falls within a range between 0.01 and 0.1, a relationship between the first performance rating and the second performance rating is satisfied to provide a target performance level to subscriber stations using the wireless communications system.

9. The method according to claim 5, wherein if $\alpha$ falls within a range between 0.01 and 0.1 the network-wide distribution for signal-to-interference is generally balanced or generally evenly distributed as perceived by subscriber stations of the wireless communications system.

10. The method according to claim 5, wherein the adaptive weights, w, are solved for using one of the following equations:

$$R_s w = \lambda (R_u + \alpha I) w;$$

or $$(R_u + \alpha I) w_1 = R_s w_0.$$

11. The method according to claim 1, wherein a coverage area comprises a particular sector among other sectors in the wireless communications system.

12. The method according to claim 1, wherein the coverage area comprises a particular cell among the other cells in the wireless communications system.

13. The method according to claim 1, wherein said loading represents a balance between a first performance rating of a particular coverage area versus a second performance rating of the wireless communications system.

14. A signal processing system for an array antenna of a base station in a wireless communications system, the signal processing system comprising:

a remodulator for recreating desired signal components based upon demodulated uplink signals for a subscriber station;

a summer coupled to the remodulator for subtracting the desired signal components from said demodulated signals for said subscriber station to yield a noise and interference signal components;

an first averager for determining a first covariance matrix for the recreated desired signal components of the demodulated uplink signals;

a second averager for determining a second covariance matrix for the noise and interference components of the demodulated uplink signals; and a data processor for determining adaptive antenna weights based on the first covariance matrix, the second covariance matrix, and a loading term, the loading term controlling contributions to said antenna weights by said first covariance matrix relative to contributions to said antenna weights by said second covariance matrix.

15. The system according to claim 14, wherein a second summer is coupled between the second averager and the data processor, the second summer having a first input of the second covariance matrix, a second input of the loading term, and an output of an expression based on the second covariance matrix.

16. The system according to claim 14, wherein the loading term has a preferential range that achieves a minimum signal-to-interference, plus noise, ratio for a majority of the subscriber stations in the wireless system, regardless of the coverage area in which the subscriber stations are located.

17. The system according to claim 14, wherein the antenna array comprises a phased array for receiving the uplink signals and transmitting downlink signals and a diversity array for receiving the uplink signals.

18. The system according to claim 17, wherein the phased array has M ports and wherein the data processor provides an principal eigenvector solution of M adaptive antenna weights for modifying downlink signals for transmission over the phased array.

19. The system according to claim 14, wherein the data processor is coupled to a weightor for applying the adaptive antenna weights to downlink signals, the weightor being coupled to an upconverter.

20. The system according to claim 14, wherein the summer, the first averager, the second averager, and the data processor comprise at least one digital signal processor; and wherein the data processor comprises an eigen-solver.

21. The system according to claim 14, wherein the adaptive weights are determined so as to balance a signal strength of a downlink signal from the base station at a desired subscriber station against interfering signal strength to other subscriber stations.

22. The system according to claim 21, wherein, when all base stations operate independently to achieve said balance, respectively, then a ratio of desired downlink signal strength relative to the combined strength of interfering downlink signals at the desired subscriber station is optimized.

23. The system according to claim 14, wherein said loading term represents a balance adjustment between a first performance rating of a particular coverage area versus a second performance rating of the wireless communications system.

24. An apparatus for processing signals from an array antenna having a plurality of receiving/transmitting elements for use in a wireless communications system, the apparatus comprising:

measuring means for measuring uplink signals from said elements of the array antenna to determine covariance measurements between pairs of the uplink signals;

first matrix means for determining a first covariance matrix for desired signal components of the measured uplink signals;

second matrix means for determining a second covariance matrix for noise and interference components of the measured uplink signals; and means for determining adaptive antenna weights based on the first covariance matrix, the second covariance matrix, and a loading term, the loading term controlling contributions to said antenna weights by said first covariance matrix relative to contributions to said antenna weights by said second covariance matrix.

* * * * *